(12) United States Patent
Chellappa et al.

(10) Patent No.: US 7,184,071 B2
(45) Date of Patent: Feb. 27, 2007

(54) METHOD OF THREE-DIMENSIONAL OBJECT RECONSTRUCTION FROM A VIDEO SEQUENCE USING A GENERIC MODEL

(75) Inventors: Ramalingam Chellappa, Potomac, MD (US); Amit K. Roy Chowdhury, College Park, MD (US); Sridhar Srinivasan, Seattle, WA (US)

(73) Assignee: University of Maryland, College Park, MD (US)

( * ) Notice: Subject to any disclaimer, the term of this patent is extended or adjusted under 35 U.S.C. 154(b) by 781 days.

(21) Appl. No.: 10/644,817

(22) Filed: Aug. 21, 2003

(65) Prior Publication Data

US 2004/0051783 A1  Mar. 18, 2004

Related U.S. Application Data

(60) Provisional application No. 60/405,601, filed on Aug. 23, 2002.

(51) Int. Cl.
*H04N 13/02* (2006.01)
(52) U.S. Cl. ............................ 348/46; 348/42; 348/51; 348/135; 382/154; 382/285; 382/277; 382/293; 382/291; 382/295
(58) Field of Classification Search ............... 348/46, 348/42, 51, 135; 382/154, 285, 277, 293, 382/291, 295
See application file for complete search history.

(56) References Cited

U.S. PATENT DOCUMENTS 5,673,081 A  *  9/1997  Yamashita et al. ............. 348/42
6,580,810 B1 *  6/2003  Yang et al. .................. 382/103

OTHER PUBLICATIONS

Srinivasan S.; "Extracting Structure from Optical Flow using the Fast Error Search Technique"; International Journal of Computer Vision; 37(3), 203-230, 2000; pp. 203-230.

* cited by examiner

*Primary Examiner*—Shawn S. An
(74) *Attorney, Agent, or Firm*—Rosenberg, Klein & Lee

(57) ABSTRACT

In a novel method of 3D modeling of an object from a video sequence using an SfM algorithm and a generic object model, the generic model is incorporated after the SfM algorithm generates a 3D estimate of the object model purely and directly from the input video sequence. An optimization framework provides for comparison of the local trends of the 3D estimate and the generic model so that the errors in the 3D estimate are corrected. The 3D estimate is obtained by fusing intermediate 3D reconstructions of pairs of frames of the video sequence after computing the uncertainty of the two frame solutions. The quality of the fusion algorithm is tracked using a rate-distortion function. In order to combine the generic model with the 3D estimate, an energy function minimization procedure is applied to the 3D estimate. The optimization is performed using a Metropolis-Hasting sampling strategy.

13 Claims, 6 Drawing Sheets

VARIANCE OF INVERSE DEPTH

STRUCTURE OF THE COVARIANCE MATRIX

METHOD OF THREE-DIMENSIONAL OBJECT RECONSTRUCTION FROM A VIDEO SEQUENCE USING A GENERIC MODEL

REFERENCE TO RELATED PATENT APPLICATION

This Utility Patent Application is based on the Provisional Patent Application No. 60/405,601 filed on 23 Aug. 2002.

This invention was made with Government support and funding from NSF Contract No. 0086075. The Government has certain rights in this invention.

FIELD OF THE INVENTION

The present invention relates to reconstructing three-dimensional (3D) models from a sequence of two-dimensional (2D) images. More particularly the invention is directed to reconstructing 3D models of an object from 2D video sequences taken from the object which may be features of a living object, for example, the face of a human being.

In overall concept of the present invention, it is directed to the method for 3D object or face reconstruction from a video sequence using a generic model in which the 3D reconstruction algorithm and the generic model are handled separately in order that the final 3D object or face model retains the specific features of the object or face in the video sequence even when these features are different from those of the generic model.

BACKGROUND OF THE INVENTION

Reconstructing 3D models from video sequences is an important problem in computer graphics with applications to recognition, medical imaging, video communications, etc. Though numerous algorithms exist which can reconstruct a 3D scene from two or more images using structure from motion (SfM) (R. I. Hartley and A. Zisserman, *Multiple View Geometry in Computer Vision*, Cambridge University Press, 2000), the quality of such reconstructions is often insufficient. The main reason for this is the poor quality of the input images and a lack of robustness in the reconstruction algorithms to deal with it (J. Oliensis, "A critique of structure from motion algorithms," Tech. Rep. http://www.neci.n-j.nec.com/homepages/oliensis/, NECI, 2000). The sensitivity and robustness of the existing reconstruction algorithms have been thoroughly analyzed. The work of Weng, et al. (J. Weng, N. Ahuga, and T. S. Huang, Optimal motion and structure estimation. *IEEE Trans. on Pattern Analysis and Machine Intelligence*, 15:864–884, September 1993; J. Weng, T. S. Huang, and N. Ahuja. 3D motion estimation, understanding, and prediction from noisy image sequences. *IEEE Trans. on Pattern Analysis and Machine Intelligence*, 9:370–389, 1987) is one of the earliest instances of estimating the standard deviation of the error in reconstruction using first-order perturbations in the input. The Cramer-Rao lower bounds on the estimation error variance of the structure and motion parameters from a sequence of monocular images was derived in T. J. Broida and R. Chellappa. Performance bounds for estimating three-dimensional motion parameters from a sequence of noisy images. *Journal of the Optical Society of America*, A., 6:879–889, 1989. Young and Chellappa derived bounds on the estimation error for structure and motion parameters from two images under perspective projection (G. S. Young and R. Chellappa, Statistical analysis of inherent ambiguities in recovering 3D motion from a noisy flow field. *IEEE Trans. on Pattern Analysis and Machine Intelligence*, 14:995–1013, October 1992) as well as from a sequence of stereo images (G. S. Young and R. Chellappa. 3D motion estimation using a sequence of noisy stereo images: Models, estimation, and uniqueness results). *Pattern Analysis and Machine Intelligence*, 12(8):735–759, August 1990). Similar results were derived in (K. Daniilidis and H. H. Nagel. The coupling of rotation and translation in motion estimation of planar surfaces. In *Conference on Computer Vision and Pattern Recognition*, pages 188–193, 1993) and the coupling of the translation and rotation for a small field of view was studied. Daniilidis and Nagel have also provided that many algorithms for three-dimensional motion estimation, which work by minimizing an objective function leading to an eigenvector solution, suffer from instabilities (K. Daniilidis and H. H. Nagel. Analytic results on error sensitivity of motion estimation from two views. *Image and Vision Computing*, 8(4):297–303, November 1990). They examined the error sensitivity in terms of translation direction, viewing angle and distance of the moving object from the camera. Zhang's work (Z. Y. Zhang. Determining the epipolar geometry and its uncertainty: A review. *International Journal of Computer Vision*, 27:161–195, March 1998) on determining the uncertainty in estimation of the fundamental matrix is another important contribution in this area. Chiuso, Brockett and Soatto (S. Soatto and R. Brockett. Optimal structure from motion: Local ambiguities and global estimates. In *Conference on Computer Vision and Pattern Recognition*, pages 282–288, 1998) have analyzed SfM in order to obtain probably convergent and optimal algorithms. Oliensis emphasized the need to understand algorithm behavior and the characteristics of the natural phenomenon that is being modeled (J. Oliensis. A critique of structure from motion algorithms. Technical Report http://www.neci.nj.nec.com/homepages/oliensis/, NECI, 2000). Ma, Kosecka and Sastry (Y. Ma, J. Kosecka, and S. Sastry. Linear differential algorithm for motion recovery: A geometric approach. *International Journal of Computer Vision*, 36:71–89, January 2000) also addressed the issues of sensitivity and robustness in their motion recovery algorithm. Sun, Ramesh and Tekalp (Z. Sun, V. Ramesh, and A. M. Tekalp. Error characterization of the factorization method. *Computer Vision and Image Understanding*, 82:110–137, May 2001) proposed an error characterization of the factorization method for 3-D shape and motion recovery from image sequences using matrix perturbation theory. Morris and Kanatani extended the covariance-based uncertainty calculations to account for geometric indeterminacies, referred to in the literature as gauge freedom (D. D. Morris, K. Kanatani, and T. Kanade. 3D model accuracy and gauge fixing. Technical report, Carnegie-Mellon University, Pittsburgh, 2000).

However, despite of such a rather extensive research and studies, the quality of prior art reconstruction techniques results in a non-optimized simulation of the reconstructed object.

One particular application of 3D reconstruction from 2D images is in the area of modeling a human face from video. The successful solution of this problem has immense potential for applications in face recognition, surveillance, multimedia, etc. A few algorithms exist which attempt to solve this problem using a generic model of a face (P. Fua, "Regularized bundle-adjustment to model heads from image sequences without calibration data," *International Journal of Computer Vision*, vol. 38, no. 2, pp. 153–171, July 2000, Y. Shan, Z. Liu, and Z. Zhang, "Model-based bundle adjustment with application to face modeling," in *International Conference on Computer Vision,* 2001, pp. 644–651). Their typical approach is to initialize the reconstruction algorithm with this generic model. The problem with this approach is that the algorithm can converge to a solution very close to the initial value of the generic model, resulting in a reconstruction which resembles the generic model rather than the particular face in the video which needs to be modeled. This method may produce acceptable results when the generic model has significant similarities with the particular face being reconstructed. However, if the features of the generic model are very different from those being reconstructed the solution from this approach may be highly erroneous.

An alternative approach to reconstruction of a 3D model of a face would be therefore highly desirable in the area of modeling of an object such as a human face which would permit generating a model of the object or human face retaining the specific features of the object or face even when these features are different from those of the generic model.

SUMMARY OF THE INVENTION

It is therefore an object of the present invention to provide a method of three-dimensional object reconstruction from a video sequence using a generic object model, wherein handling of the 3D reconstruction process and the generic model are separated in order to retain in the object model the particular characteristics of the object that is being modeled.

It is another object of the present invention to provide a method of 3D reconstruction of an object such as a human face from video where a 3D estimate of the object model is obtained purely from the video sequence prior to introduction of data related to the generic model.

It is also an object of the present invention to provide a method of three-dimensional object reconstruction from a video sequence wherein a plurality of 3D estimates (intermediate reconstruction) for each pair of adjacent images of the video sequence is obtained purely from the input video sequence and integrated (fused) together after evaluating the quality of each such intermediate reconstruction and wherein the progress of the fusion strategy is monitored as the number of processed images in the video sequence increases.

It is still an object of the present invention to provide a method of three-dimensional object reconstruction from a video sequence, wherein a generic model is introduced only after the fused (or final) 3D estimate of the object model reflecting all images of the video sequence is obtained in order to prevent the effect of the features of the generic model on the process on the early stages thereof, thus allowing to obtain a resulting object model having only features of a particular object to be modeled.

It is a further object of the present invention to provide a method of three-dimensional object reconstruction wherein the fused 3D estimate of the object model is combined with the generic model only for the purpose of correcting the specific local regions of the fused 3D estimate of the object model where sharp depth discontinuities are found.

According to the teachings of the present invention, in a method for three-dimensional object reconstruction, a sequence of video images of the object are introduced into the processing system for obtaining a plurality of 3D estimates of the object model. The quality of each 3D estimate of the object model is evaluated to obtain data on possible errors (level of distortion) contained therein. The 3D estimates are fused together to obtain a final 3D estimate for the entire video sequence. In order to optimize (or smooth) the final 3D estimate of the object model, e.g., to correct the errors contained in local regions thereof, a generic object model is introduced in the processing system, and the local regions of the 3D estimate containing errors are compared with the corresponding regions of the generic object model, in order that these errors may be corrected in the final 3D estimate. By this process, a final 3D object model of high quality and resembling the particular object to be modeled is generated.

In order to obtain the final 3D estimate of the object model to be compared with the generic object model, a plurality of the multi-frame (two-frame) intermediate reconstructions, each corresponding to a pair of adjacent images in the video sequence is obtained. The plurality of multi-frame intermediate reconstructions are fused together after evaluating the quality of each. Each multiframe intermediate reconstruction is obtained by applying "structure from motion" (SfM) techniques directly to the video sequence. The evaluation of the quality of each of the plurality of the multi-frame intermediate reconstructions is performed by analytically estimating the statistical error covariance from the optical flow computed purely from the video images.

In the method of the present invention, the optimization of the fused (final) 3D estimate of the object model is further performed by applying Markov Chain Monte Carlo sampling techniques thereto.

The fusing of the plurality of the multi-frame intermediate reconstructions is monitored in order to determine the number of the multi-frame intermediate reconstructions required to obtain a fused 3D estimate of the object model to be combined with the generic face model.

In order to optimize the final 3D estimate, the latter is aligned with said generic model. The boundaries of the regions containing sharp depth discontinuities are then identified and the regions enveloped by said boundaries are smoothed.

These and other novel features and advantages of this invention will be fully understood from the following detailed description of the accompanying Drawings.

BRIEF DESCRIPTION OF THE DRAWINGS

FIGS. 8A–8D are mesh representations of the 3D model obtained at the different stages of the process of the present invention; wherein FIG. 8A represents the generic mesh, FIG. 8B represents the model obtained from the SFM algorithm, FIG. 8C represents the smoothed mesh obtained after the optimization procedure, and FIG. 8D represents a finer version of the smoothed mesh for the purpose of texture mapping;

DESCRIPTION OF THE PREFERRED EMBODIMENTS

Figure 1:
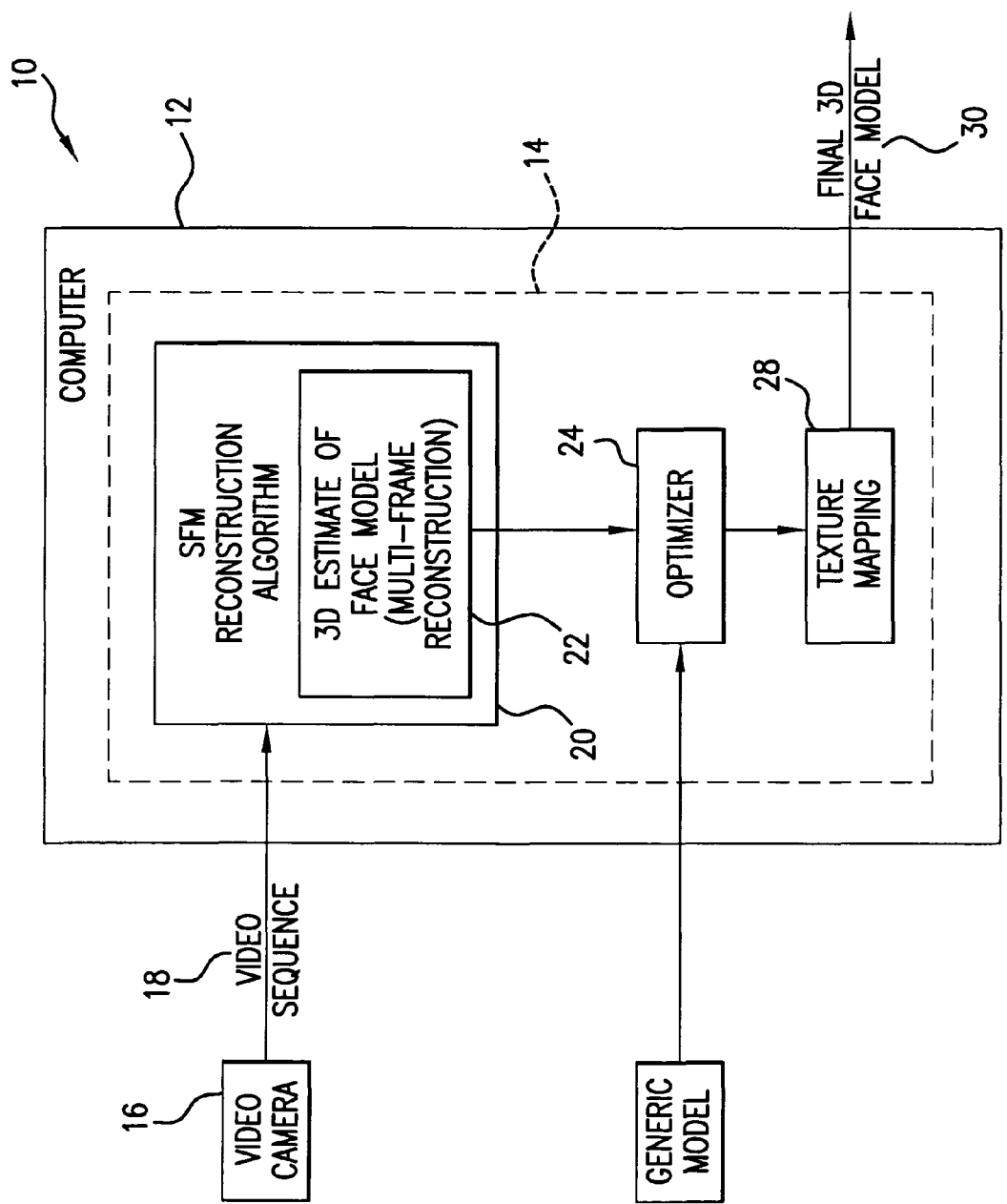
FIG. 1 is a simplified block diagram representation of the processing system underlying the method of the present invention.

Referring to FIG. 1, representing a block diagram of the system of the present invention underlying the method for three-dimensional object reconstruction from a video sequence using the generic object model, which for purposes of example and clarity will be a face of a living being, but it is understood that the method may be applied to any object. The system 10 includes a computer 12 which hosts a model creating algorithm 14 of the present invention. The system 10 further includes a video camera 16 taking a sequence of images of a person whose face is to be modeled and outputting a video sequence 18 which is input into the computer 12, for being processed in accordance with the algorithm 14 as presented in detail in further paragraphs.

Figure 2:
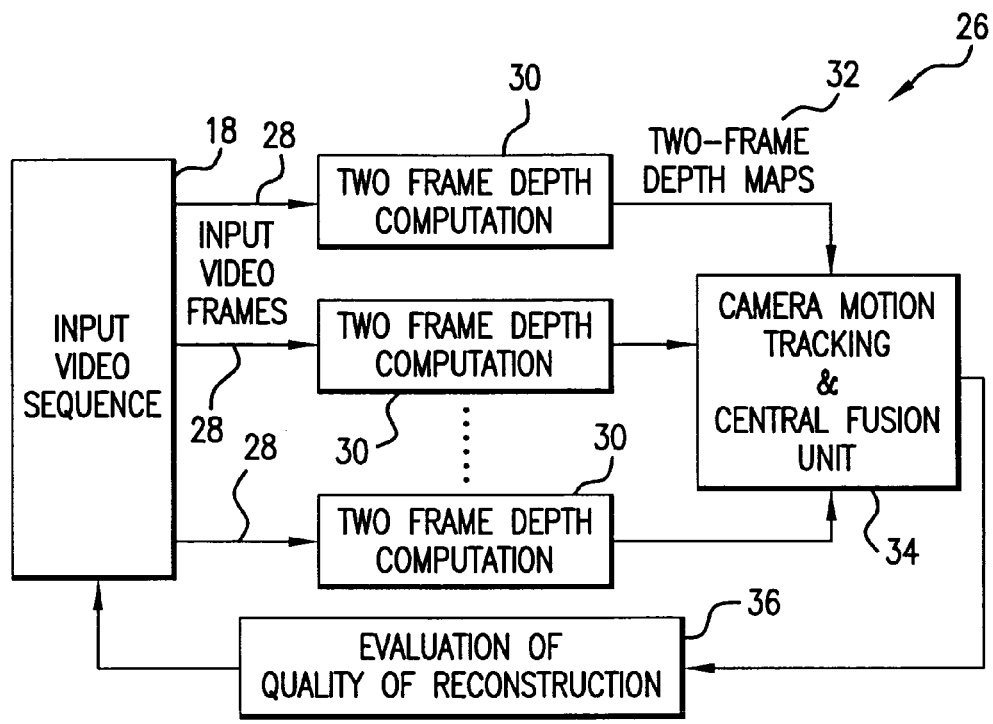
FIG. 2 is a block diagram of the 3D reconstruction framework of the present invention.
Figure 3:
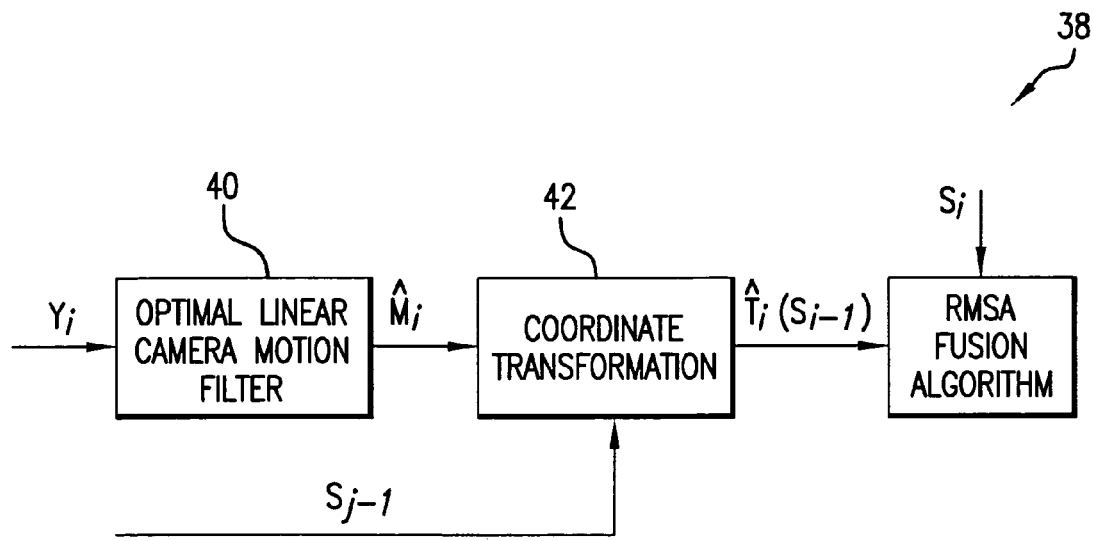
FIG. 3 is a block diagram of the multi-frame fusion algorithm of the present invention.
Figure 4:
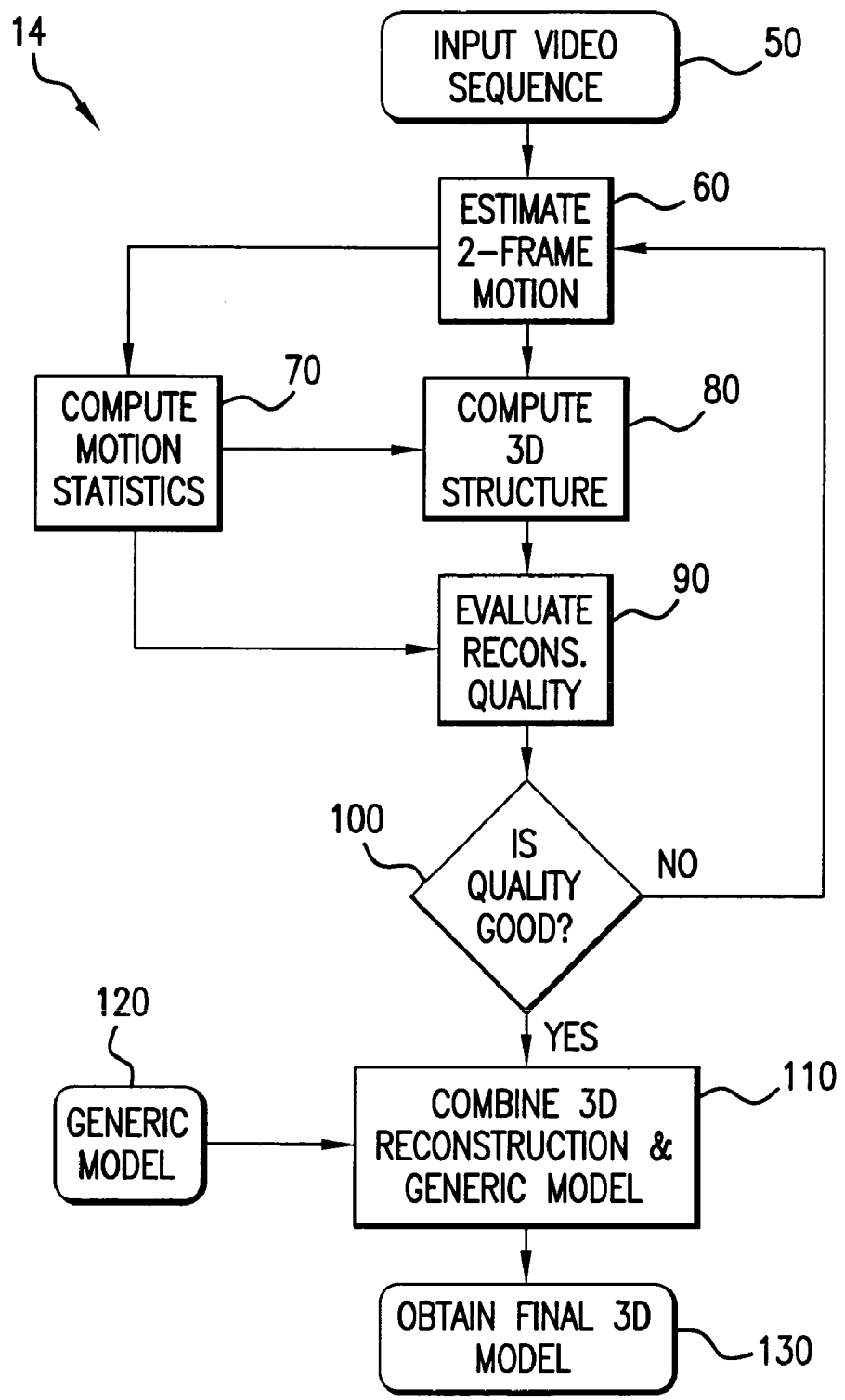
FIG. 4 represents a flow chart diagram of the overall algorithm underlying the method of the present invention.

The algorithm 14 comprises a "structure from motion (SFM)" reconstruction algorithm 20 which processes the video sequence and reconstructs purely from the video data the creation of a 3D estimate 22 of face model in a process described in detail infra in conjunction with FIGS. 2–4. Particularly, the 3D estimate of the face model is created based on two-frame reconstruction principles, where, for each two consecutive images of the video sequence, a 3D intermediate two-frame estimate is created. The quality of each intermediate estimate is evaluated by analytically estimating the statistical error covariance from an optical flow for each two-frame intermediate estimate. These intermediate two-frame estimates are then combined (fused) together using a least median of squares (LMedS) estimator. The fusion of the plurality of intermediate two frame estimates for all the pairs of the consecutive frames of the video sequence is performed recursively using a Robbins-Monro stochastic approximation (RMSA) algorithm. At each stage (in incremental fusions of consecutive intermediate two-frame estimates), the quality of the fusion algorithm is analyzed using a rate- distortion characteristic which is a plot of the error in reconstruction after fusion as a function of the number of frames in the video sequence. This is used to determine a termination criteria for the 3D reconstruction algorithm as will be represented infra.

Upon creating a final (fused) 3D estimate of the face model for the entire video sequence, such a final 3D estimate has to be corrected for localized errors which still remain and which were not detected using the error correction strategy in the block 20 of the system 10. The reason for correcting localized errors is that while the error covariance calculations can identify and correct for small errors due to the noise in the input data, they are unable to correct the larger errors due to outliers which are present in any two frame depth estimate and need to be identified and removed from the fusion algorithm. To correct the final 3D estimate (smoothing), it is processed in the optimizer 24 to which a generic model is input and is used to correct for all the errors due to the outliers of the fused 3D estimate of the face model. A regularization approach to incorporating the generic model is employed in the system of the present invention by imposing smoothness constraints on the final (fused) 3D reconstruction by use of energy functions (also known as variational methods, regularization theory, and relaxation methods). Regularization theory works by minimizing a functional, for example, an energy function $E[f(x)]$ with respect to a function $f(x)$. It usually contains one term (a consistency or fidelity term) which ensures that the smoothed solution is close to the data, and a second term (a regularization term) which imposes smoothness constraints on the solution. In most implementations, where the data is specified on a regular lattice, the energy function is discretized as $E[f_i]$. The energy minimization/regularization approach can be incorporated directly into a Bayesian statistics framework using the Gibbs distribution by defining a probability $$P(f) = \frac{1}{Z}$$

exp $(-\beta E(f))$ where $\beta$ is a constant and $Z$ is a normalization term. The use of Gibbs distributions on discretized energy functions leads to a mathematical structure known as Markov Random Fields (MRF). An MRF consists of a probability distribution over a set of variables $\{f_i\}$, with a neighborhood $N_i$, such that $P(f_i|f_j, j \in N_i) = P(f_i|f_j,$ for all j). One of the most influential formulations of the vision problem in terms of MRFs has been the work of Geman and Geman on image segmentation, in which images are smoothed except at places where the image values are rapidly changing.

In the method of the present invention, the final (or fused) 3D estimate obtained from the SfM reconstruction algorithm 20 must be smoothed in local regions where the errors have been found. These regions are identified with the help of the generic model. After the 3D depth estimate and the generic model have been aligned (in the optimizer 24), the boundaries where there are sharp depth discontinuities are identified from the generic model.

Each vertex of the triangular mesh representing the model is assigned a binary random variable (defined as a line process) depending upon whether or not it is part of a depth boundary. The regions which are inside these boundaries are smoothed. The energy function (Eq. 23, infra) employed for optimization of the fused 3D estimate of the face model, consists of two terms which determine the closeness of the final smoothed solution to either the generic model or the 3D depth estimate, and a third term which determines whether or not a particular vertex of the mesh should be smoothed based on the value of the random variable representing the line process for that vertex. The combinatorial optimization problem is solved using simulated annealing and a Markov Chain Monte Carlo sampling stragegy.

Upon the smoothed and substantially free of errors face model having been created in the optimizer 24, a texture 28 is mapped onto the face model, thereby finalizing the process of model creation. The final 3D face model 30 is output from the computer 12.

In further paragraphs, a process of evaluating the 3D estimate using the SfM reconstruction approach, a method of computing the errors in the two-frame 3D estimates as functions of the errors in the image plane motion, how the error propagates through the video sequence during the fusion process, and the algorithm for obtaining the multi-frame 3D estimate will be described in detail.

Particularly, since the motion between adjacent frames in a video sequence of a face is usually small, the optical flow framework shown in FIG. 2 is employed in the present invention for reconstructing the structure. It is assumed that the coordinate frame is attached rigidly to the camera with the origin at the center of perspective projection and the z-axis perpendicular to the image plane. The camera is moved with respect to the face being modeled (which is assumed rigid) with translational velocity $v=[v_x, v_y, v_z]'$ and rotational velocity $\Omega=[\omega_x, \omega_y, \omega_z]'$ (this can be reversed by simply changing the sign of the velocity vector). Using the small-motion approximation to the perspective projection model for motion field analysis, and denoting by $p(x, y)$ and $q(x, y)$, the horizontal and vertical velocity fields of a point $(x, y)$ in the image plane, the equations relating the object motion and scene depth can be written as:

$$p(x, y) = (x - fx_f)h(x, y) + \frac{1}{f}xy\omega_x - \left(f + \frac{1}{f}x^2\right)\omega_y + y\omega_z \quad (1)$$

$$q(x, y) = (y - fy_f)h(x, y) + \left(f + \frac{1}{f}y^2\right)\omega_x - \frac{1}{f}wy\omega_y - x\omega_z,$$

where $g(x, y)=1/z(x, y)$ is the inverse scene depth, $f$ is the focal length of the camera, $$(x_f, y_f) = \left(\frac{v_z}{v_z}, \frac{v_y}{v_z}\right)$$

is known as the focus of expansion (FOE) and $$h(x, y) = \frac{v_z}{z(x, y)}.$$

It is assumed that the FOE is known over a few frames of the video sequence. Since the motion between adjacent frames in a video sequence is usually small, it is reasonable to assume that the FOE can be computed from the first two or three frames and then assumed constant over the next few frames. For N corresponding points, it is defined:

$h=(h_1, h_2, \ldots, h_N)'$ $u=(p_1, q_1, p_2, q_2, \ldots p_N, q_N)'$ $r_i=(x_iy_i,-(1+x_i^2), y_i)'$ $s_i=(1+y_i^2,-x_iy_i,-x_i)'$ $\Omega=(w_x, w_y, w_z)'$ $Q=[r_1 s_1 r_2 s_2 \ldots r_N s_N]'$ $$P = \begin{bmatrix} x_1 - x_f & 0 & \cdots & 0 \\ y_1 - y_f & 0 & \cdots & 0 \\ 0 & x_2 - x_f & \cdots & 0 \\ 0 & y_2 - y_f & \cdots & 0 \\ \vdots & \vdots & \ddots & \vdots \\ 0 & 0 & \cdots & x_N - x_f \\ 0 & 0 & \cdots & y_N - y_f \end{bmatrix} \quad (2)$$

$A = [P \; Q]$ $z = \begin{bmatrix} h \\ \Omega \end{bmatrix}$

Then (Eq. 1) can be written as $$Az=u, \quad (3)$$

where $z$ is the reconstructed 3D depth, and $u$ is the estimate of the optical flow.

Computing the Uncertainty of Two-frame Reconstruction

The aim is to obtain a quantitative idea of the accuracy of the 3D reconstruction $z$ as a function of the uncertainty in the motion estimates $u$. Let us denote by $R_u$ the covariance matrix of $u$ and by $C$ the cost function $$C = \frac{1}{2}||Az - u||^2 \quad (4)$$

$$= \frac{1}{2}\sum_{i=1}^{n=2N} C_i^2(u_i, z).$$

It was proven by the inventors of the present invention that the covariance of $z$ can be expressed as $$R_z = H^{-1}\left(\sum_{ij} \frac{\delta C_i'}{\delta z}\frac{\delta C_i}{\delta u} R_u \frac{\delta C_j'}{\delta u}\frac{\delta C_j}{\delta z}\right)H'^{-T}, \text{ where} \quad (5)$$

$$H \approx \sum_i \frac{\delta C_i'}{\delta z}\frac{\delta C_i}{\delta u}. \quad (6)$$

This gives a precise relationship between the uncertainty of the image correspondences $R_u$ and the uncertainty of the depth and motion estimates $R_z$.

Denoting by $\bar{i}=[i/2]$, the upper ceiling of $i/2$, the number of feature points by N and letting i=1, n=2N, it can be defined:

$$A_{\bar{i}p} = [\,0 \ldots 0 - x_{\bar{i}} - x_f \; 0 \ldots 0 - x_{\bar{i}}y_{\bar{i}} \; (1 + x_{\bar{i}}^2 - y_{\bar{i}}\,], \quad (7)$$

$$= [-(x_{\bar{i}} - x_f)1_{\bar{i}}(N)|-r_{\bar{i}}] = [A_{\bar{i}ph}|A_{\bar{i}pm}]$$

$$A_{\bar{i}q} = [\,0 \ldots 0 - (y_{\bar{i}} - y_f) \; 0 \ldots 0 - (1 + y_{\bar{i}}^2)x_{\bar{i}}y_{\bar{i}} \; x_{\bar{i}}\,],$$

$$= [-(y_{\bar{i}} - y_f)1_{\bar{i}}(N)|-s_{\bar{i}}] = [A_{\bar{i}qh}|A_{\bar{i}qm}]$$

where $1_n(N)$ denotes a 1 in the $n^{th}$ position of the array (of length N) and zeros elsewhere. From (Eq. 4) we obtain:

$$\frac{\delta C_i}{\delta z} = \begin{cases} A_{\bar{i}p}, & i \text{ odd} \\ A_{\bar{i}q}, & i \text{ even} \end{cases} \quad (8)$$

as a 1×(N+3) dimensional vector and $$\frac{\delta C_i}{\delta u} = \left[\frac{\delta C_i}{\delta p_1} \; \frac{\delta C_i}{\delta q_1} \; \cdots \; \frac{\delta C_i}{\delta p_N} \; \frac{\delta C_i}{\delta q_N}\right], \quad (9)$$

as a 1×2N dimensional array. Hence the Hessian from (Eq. 6) becomes $$H = \sum_{i=1}^{N} \left( A'_{ip} A_{iq} + A'_{iq} A_{ip} \right) \quad (10)$$

Assuming that the feature points as well as the components of the motion vector at each feature point are independent of each other, $R_u=\text{diag}[R_{u1p}, R_{u1q}, \ldots R_{uNp}, R_{uNq}]$ and a simpler relationship can be obtained for the error covariances in (Eq. 5) as $$R_z = H^{-1} \left( \sum_i \frac{\delta C'_i}{\delta z} \frac{\delta C_i}{\delta u} R_u \frac{\delta C'_i}{\delta u} \frac{\delta C_i}{\delta z} \right) H^{-T} \quad (11)$$

If we make the even stronger assumption that the components of $R_u$ are all identical (with variance $r^2$), i.e. $R_u = r^2 I_{2N \times 2N}$, then (11) simplifies to $$R_z = H^{-1}(r^2 H) H^{-T} = r^2 H^{-1}. \quad (12)$$

Because of the partitioning of z in (Eq. 2), it can be written $$R_z = \begin{bmatrix} R_h & R_{hm} \\ R_{hm}^T & R_m \end{bmatrix} \quad (13)$$

Multi-frame Uncertainty Analysis

Since the final 3D estimate of the face will be obtained by fusing two-frame reconstructions, it is important to track the quality of the multi-frame fusion algorithm. A rate-distortion function was derived which is a closed-form expression for distortions in the fused reconstructions as a function of the error covariance in the image plane motion estimates and the number of frames. The covariance of the fused estimate of the j-th feature point can be shown to be $$\text{Cov}[\overline{X}_j] = \frac{1}{N^2} \left[ \sum_{i=1}^{N} R_h^i(j, j) \right] \quad (14)$$

where $R_h^i(j, j)$ is the j-th diagonal term obtained from (Eq. 13) for the i-th and (i+1)-st frames. The average distortion in the reconstruction over M feature points and N frames is $$E_{M,N}\left[(\overline{X} - E[\overline{X}])^2\right] = E_M\left[E_N\left[(\overline{X} - E[\overline{X}])^2 \mid X = X_j\right]\right] \quad (15)$$

$$= \frac{1}{MN^2} \sum_{j=1}^{M} \sum_{i=1}^{N} R_h^i(j, j)$$

$$= \frac{1}{MN^2} \sum_{i=1}^{N} \text{trace}(R_h^i).$$

Eq. (15) is called the multi-frame SfM (MFSfM) rate-distortion function, hereafter referred to as the video rate-distortion (VRD) function. Given a particular tolerable level of distortion, the VRD specifies the minimum number of frames necessary to achieve that level. The VRD also identifies an operating point of an MFSfM algorithm as a trade-off between tolerable reconstruction error and the computational cost of considering more frames.

Referring again to FIG. 2 which shows a block diagram schematic of the complete 3D face reconstruction framework 26 using SfM, the input of the 3D face reconstruction framework is a video sequence 18. In the framework 26 of the present invention, an appropriate two-frame depth reconstruction strategy, such as for example, "extracting structure from optical flow using fast error search" technique, is chosen. The video frames 28 of the input video sequence are supplied to two-frame depth computation logical blocks 30 which generate two-frame depth maps 32 at the outputs thereof and supply the thus generated maps to the camera motion tracking and central fusion unit 34. In the unit 34, the depth maps 32 are aligned to a single frame of reference and the aligned depth maps are fused together using stochastic approximation. Particularly, as will be described in detail in further paragraphs, in the 3D face reconstruction framework 26 of the present invention, a Robbins-Monro stochastic approximation (RMSA) algorithm is used, where it is enough to align the fused sub-estimate and the two-frame depth for each pair of frames and proceed as more images become available.

For each fused reconstruction, the evaluation of the quality of reconstruction in block 36 is performed by means of applying a rate distortion function to optimize the fusion strategy and to design a stopping or termination criterion when a tolerable level of distortion will be achieved. The stopping criterion is looped to the input video sequence block 18 in order to stop or terminate inputting the video frames once the stopping criterion has been met.

In the system shown in FIG. 2, a recursive strategy is employed for estimating the true depth given the observations (reconstructions). The observation model assumes additive noise on the true value but does not assume any particular distribution of the noise process. It will be shown that the estimate converges to the true value asymptotically. In the system 26 shown in FIG. 2, the number of frames to consider before stopping the process is evaluated by computing rate-distortion function.

Let the position vector $s^i$ represent the 3D estimate, computed for a particular point, from i-th and (i+1)-st frame, $i=1, \ldots, K$, where the total number of frames is K+1. The fused structure sub-estimate at the i-th frame is denoted by a position vector $S^i$. $\Omega^i$ and $V^i$ represent the rotation and translation of the camera between the i-th and (i+1)-st frames. (The camera motion estimates are valid for all the points in the object in that frame.) The 3×3 rotation matrix $P^i$ describes the change of coordinates between times i and i+1, and is orthonormal with positive determinant. When the rotational velocity $\Omega$ is held constant between time samples, P is related to $\Omega$ by $P=e^\Omega$. For any vector $a=[a_1, a_2, a_3]'$, there exists a unique skew-symmetric matrix $$\hat{a} = \begin{bmatrix} 0 & -a_3 & a_2 \\ a_3 & 0 & -a_1 \\ -a_2 & a_1 & 0 \end{bmatrix} \quad (16)$$

The operator $\hat{a}$ a performs the vector product on $R^3$: $\hat{a}X = a \times X$, $\forall X \in R^3$. The fused sub-estimate $S^i$ can now be transformed as $T^i(S^i) = P^i S^i + V^i$. But in order to do this, the motion parameters V and Ω need to be estimated. Since only the direction of translational motion ($v_x/v_z$, $v_y/v_z$) can be determined, the motion components will be represented by the vector $$m = \left[\frac{v_z}{v_z}, \frac{v_y}{v_z}, \omega_x, \omega_y, \omega_z\right]'.$$

To keep the notation simple, m will be used to denote each of the components of m. Thus, the problem at stage (i+1) will be to a) reliably track the motion parameters obtained from the two-frame solutions, and b) fuse $s^{i+1}$ and $T^i(S^i)$. If $\{l^i\}$ is the transformed sequence of inverse depth value with respect to a common frame of reference, then the optimal value of the depth (the optimized cost function) at the point under consideration is obtained as $$u^* = \arg\min \text{median}_i\, (w_l^i(l^i-u)^2), \quad (17)$$

where $w_l^i = R_h^i(l))_{-1}^u = (P^i R_h^i P_i)^{-1}$. However, since a recursive strategy is employed, it is not necessary to align all the depth maps to a common frame of reference a priori. A Robbins-Monroe stochastic approximation (RMSA) algorithm is used in the present method where it is enough to align the fused sub-estimate and the two-frame depth for each pair of frames and proceed as more images become available. The Robbins-Monro stochastic approximation algorithm is a stochastic search technique for finding the root $\theta^*$ to $g(\theta)=0$ based on noisy measurements of $g(\theta)$.

For each feature point, $X^i(u)$ is computed: $X^i(u)=w_l^i(l^i-u)^2$, $u \in U$. Since the median is less sensitive to outlying points than the mean, the aim is to compute the median ($\theta$) of $X^0, \ldots, X^K$ i.e. to obtain $\theta$ such that $g(\theta)=F_X(\theta)-0.5=0$, where $F_X(\theta)$ is the distribution function of $\theta$. It is defined $Y^k(\hat{\theta}^k)=p^k(\hat{\theta}^k)-0.5$, where $p^k(\hat{\theta}^k)=I_{[X^k \leq \hat{T}^k(\hat{\theta}^k)]}$ (I represents the function indicator, $\hat{T}^k$ is the estimate of the camera motion and $\hat{\theta}^k$ is the estimate obtained at the $k^{th}$ stage). Then $$E[Y^k(\hat{\theta}^k)|\hat{\theta}^k] = E[p^k(\hat{\theta}^k)|\hat{\theta}^k] - 0.5$$
$$= E\left[I_{[X^k \leq \hat{T}^k(\hat{\theta}^k)]}\right] - 0.5$$
$$= P(X^k \leq \hat{T}^k(\hat{\theta}^k)) - 0.5$$
$$= F_X(\hat{\theta}^k) - 0.5 = g(\hat{\theta}^k).$$

The RM (Robbins-Monro) recursion for the problem is $$\hat{\theta}^{k+1} = \hat{T}^k(\hat{\theta}^k) - a^k(p^k(\hat{\theta}^k) - 0.5),$$

where $a^k$ is determined by Eq. (28) infra. When k=K, we obtain the fused inverse depth $\hat{\theta}^{K+1}$, from which we can get the fused depth value $S^{K+1}$.

The next step performed in the block 34 is to estimate the camera motion $\hat{T}$. Let m denote each component of the motion vector m. A simple difference equation model is assumed for the motion parameters $$y^i = m^i + n^i \quad (19)$$

where $y^i$ denotes the value of the motion parameter obtained from the two-frame algorithm and $m^i$ is to be estimated. $n^i$ is the equation error and its variance is sought to be minimized, i.e., $\min_m{}^i V(m^i)$, where $$V(m^i) = \frac{1}{2} E[y^i - m^i]^2 \quad (20)$$

In the framework of Eq. 26 (presented infra)

$$-\frac{dV(m^i)}{dm^i} = E[y^i - m^i] = 0 \quad (21)$$

which implies that $Q(x, e_i) = [y^i - m^i]$ where $x = m^i$ and $e_i = y^i$. The Hessian, $$\frac{d^2 V(m^i)}{dm^{i2}} = 1.$$

Thus applying the stochastic Newton method of Eq. 29, infra, the recursion for tracking the camera motion becomes $$\hat{m}^i = \hat{m}^{i-1} - a^k[y^i - \hat{m}^{i-1}]. \quad (22)$$

However, since the camera motion changes from frame to frame and the time variation of $m^i$ is to be tracked, the last condition of convergence in Eq. 28 infra is to be relaxed. Let $a_k$ tend to a small positive number $a_o$. The value of $a_o$ will be determined as a tradeoff between tracking capability ($a_o$ small) and noise sensitivity ($a_o$ large).

Alternatively, the camera motion may be estimated using the Kalman Filter with the similar results.

The Reconstruction Algorithm. The fused 3D structure $S^i$ is obtained from i frames and the two-frame depth map $s^{i+1}$ computed from the i-th and (i+1)-st frames. FIG. 3 shows a block diagram of the multi-frame fusion algorithm 38 performed in the unit 34 of the framework 26. The main steps of the algorithm are:

Track Estimate the camera motion according to the optimal camera motion estimation filter (the tracking algorithm 40);

Transform Transform the previous model $S^i$ to the new reference frame in the block 42;

Update Update the transformed model using $s^{i+1}$ to obtain $S^{i+1}$ from Eq. 18;

Evaluate Reconstruction Compute a performance measure for the fused reconstruction from (Eq. 15);

Iterate Decide whether to stop on the basis of the performance measure. If not, set i=i+1 and go back to Track.

The generic model is incorporated into the system after obtaining the 3D estimate from the video sequence using the SfM algorithm described supra, as shown in FIG. 1. The optimizer 24 is used for combining the two models in such a way that the errors in the final 3D estimate are corrected for by comparison with the generic model.

The Optimization Function: Both the generic model and the 3D estimate have a triangular mesh representation with N vertices and the depth at each of these vertices is known. $\{d_{gi}, i=1, \ldots, N\}$ denotes the set of depth values of the generic mesh for each of the N vertices of the triangles of the mesh. Let $\{d_{si}, i=1, \ldots, N\}$ be the corresponding depth values from the SfM estimate. The goal is to obtain a set of values $\{f_i, i=1, \ldots N\}$ which are a smoothed version of the SfM model, after correcting the errors on the basis of the generic mesh.

Since the specific features of the face are to be retained in the model, the error correction strategy will work by comparing local regions in the two models and smoothing those parts of the SfM estimate where the trend of the depth values is significantly different from that in the generic model, e.g. a sudden peak on the forehead will be detected as an outlier after the comparison and smoothed. Towards this goal, a line process is introduced on the depth values. The line process indicates the borders where the depth values have sudden changes, and is calculated on the basis of the generic mesh, since it is free from errors. For each of the N vertices, a binary number is assigned indicating whether or not it is part of the line process.

The optimization function proposed in the subject system is $$E(f) = \sum_{i=1}^{N} (f_i - d_{gi})^2 + (1-\mu)\sum_{i=1}^{N}(f_i - d_{si})^2 + \mu\sum_{i=1}^{N}(1-l_i)\sum_{j\in N_i}(f_i - f_j)^2 1_{d_s \neq d_g}, \quad (23)$$

where $l_i=1$ if the $i^{th}$ vertex is part of a line process and $\mu$ is a combining factor which controls the extend of the smoothing. $N_i$ is the set of vertices which are neighbors of the $i^{th}$ vertex. $1_{d_s \neq d_g}$ represents the indicator function which is 1 if $d_s \neq d_g$, else 0. In order to understand the importance of (Eq. 23), consider the third term. When $l_i=1$, the $i^{th}$ vertex is part of a line process and should not be smoothed on the basis of the values in $N_i$; hence this term is switched off. Any errors in the value of this particular vertex will be corrected on the basis of the first two terms, which control how close the final smoothed mesh will be to the generic one and the SfM estimate. When $l_i=0$, indicating that the $i^{th}$ vertex is not part of a line process, its final value in the smoothed mesh is determined by the neighbors as well as its corresponding values in the generic model and SfM estimate. The importance of each of these terms is controlled by the factor $0<\mu<1$. In the case (largely academic) where $d_s=d_g$, the smoothed mesh can be either $d_s$ or $d_g$ and this is taken care of in the indicator function in the third term in (Eq. 23).

In order to solve the optimization problem in (Eq. 23), the technique of simulated annealing is used which is built upon the Markov Chain Monte Carlo (MCMC) framework. The MCMC optimizer is essentially a Monte Carlo integration procedure in which the random samples are produced by evolving a Markov chain. Let $T_1 > T_2 > \ldots > T_k >$ be a sequence of monotone decreasing temperatures in which $T_1$ is reasonably large and $\lim_{T_k \to \infty} = 0$. At each such $T_k$, we run $N_k$ iterations of a Metropolis-Hastings (M-H) sampler (A. Doucet. On sequential simulation based methods for bayesian filtering. *Statistics and Computing*, 10(3):197–208, 1998; R. M. Neal. Probabilistic inference using Markov chain Monte Carlo methods. Technical Report CRG-TR-93-1, University of Toronto, 1993) with the target distribution $\pi_k(f) \propto \exp\{-E(f)/T_k\}$. For any given target probability distribution $\pi(x)$, the Metropolis-Hastings algorithm prescribes a transition rule for a Markov chain so that the equilibrium distribution of the chain is $\pi(x)$. To start the algorithm, one needs to choose an arbitrary, but easy to sample from, transition function $T(x, y)$ (also called a proposal distribution). Then, given a current state $x^{(t)}$, Draw $y$ from the transition function $x^{(t)}, y)$.
Draw $U \sim$ Uniform $[0, 1]$ and update $$x^{(t+1)} = \begin{cases} y \\ x^{(t)} \end{cases} \quad \text{if } U \leq p(x^{(t)}, y) \text{ else} \quad (24)$$

Various functions have been suggested for p. For example, Metropolis and Hastings (M-H) suggested $$p(x, y) = \min\left\{1, \frac{\pi(y)T(x, y)}{\pi(x)T(x, y)}\right\} \quad (25)$$

As k increases, $\pi_k$ puts more and more of its probability mass (converging to 1) in the vicinity of the global maximum of E. Since minimizing $E(f)$ is equivalent to maximizing $\pi(f)$, we will almost surely be in the vicinity of the global optimum if the number of iterations $N_k$ of the M-H sampler is sufficiently large. The steps of the algorithm are:

Initialize at an arbitrary configurations $f_0$ and initial temperature level $T_1$.

For each k, run $N_k$ steps of MCMC iterations with $\pi_k(f)$ as the target distribution. Pass the final configuration of x to the next iteration.

Increase k to k+1.

Mesh Registration: The optimization procedure described supra requires a one-to-one mapping of the vertices $\{d_{si}\}$ and $\{d_{gi}\}$. Once the 3D estimate is obtained from the SfM algorithm, a set of corresponding points between this estimate and the generic mesh is identified manually. This is then used to obtain a registration between the two models. Thereafter, using proper interpolation techniques, the depth values of the SfM estimate are generated corresponding to the (x, y) coordinates of the vertices of the triangles in the generic model. By this method, the meshes are obtained with the same set of N vertices, i.e., the same triangulation.

The Generic Mesh Algorithm includes the following main steps for incorporating the generic mesh:

1. Obtain the 3D estimate from the given video sequence using SfM at the output of the block 20 of FIG. 1;

2. Register this 3D model with the generic mesh and obtain the depth estimate whose vertices are in one-to-one correspondence with the vertices of the generic mesh;

3. Compute the line processes and to each vertex i assign a binary value $l_i$;

4. Obtain the smoothed mesh $f_i$ from the optimization function in (Eq. 23) at the output of block 24 of FIG. 1; and 5. Map the texture onto f from the video sequence in block 28 to obtain the final face model 30.

The Final 3D Model. The complete 3D reconstruction paradigm is composed of a sequential application of the two algorithms (3D Reconstruction Algorithm and the Generic Mesh Algorithm), as described in conjunction with FIGS. 1 and 2, supra, as well as FIG. 4, infra.

Referring to FIG. 4, which illustrates a flow chart diagram of the complete algorithm of the method of three-dimensional face reconstruction of the present invention, the process starts in the block 50 "Input Video Sequence" where the video sequence comprising a plurality of sequential frames containing the face of a person to be modeled is input into the system. From the block 50, the logic flows to the block 60 "Estimate Two-Frame Motion" where an estimation of camera motion for two adjacent frames is performed as described in detail supra. From the block 60, the logic flows to block 70 "Compute Motion Statistic" to obtain data on the depth for each point in two adjacent frames. From block 60, the logic flows to the block 80 "Compute 3D Structure" where, based on two consecutive frames of the video sequence and also based on computed motion statistics data from the block 70, the algorithm computes and generates a 3D estimate for the face model. Further, the flow moves to the block 90 "Evaluate Reconstruction Quality" where, based on the computed motion statistic in block 70, the logic evaluates the quality of each 3D estimate prior to these estimates to be integrated with other intermediate reconstructions for the whole video sequence.

From the block 90 the process moves to the logic block 100 "Is Quality Good?". If the quality is not sufficient and there are errors found in the 3D estimate of the face model, the logic flows back to the block 60 to repeat the process for the next pair of adjacent frames and to fuse the intermediate estimates together. If however, the quality of the 3D estimate is good enough, meaning that a tolerable level of the distortion has been achieved and the process of fusion may be stopped (e.g., sufficient number of the frames has been processed and fused together) such a final 3D estimate is to be combined (fused) with the generic model 120 which is supplied to the block 110 "Combine 3D Reconstruction and Generic Model" where the final 3D estimate is smoothed for the error found therein.

From the block 110, the logic flows to block 130 "Obtain Final 3D Model" where after mapping the textures into the smoothed 3D estimate face model, the final 3D model of the face is generated.

Figure 5A:
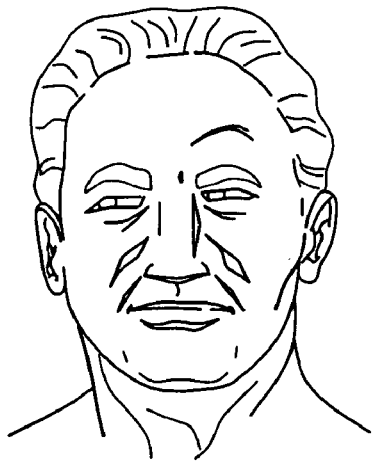
FIGS. 5A and 5B are two views from the original video sequence which represents the input to the SFM reconstruction algorithm.
Figure 5B:

Experiments have been performed in which two consecutive frames of the video sequence, for example, as shown in FIGS. 5A and 5B, were entered into the system 10 to be processed in accordance with the SfM algorithm 20 of FIG. 1. A two-frame algorithm computed the 3D estimate 22 from the optical flow using the two consecutive frames and then integrated over the entire video sequence using robust estimation techniques, was accomplished.

As shown in FIG. 2, a plurality of two-frame depth computations were performed in blocks 30 and were integrated in the unit 34 for the entire video sequence which was entered into the system. The errors in the motion estimate were computed by tracking a set of features over the first few frames of the video sequence which were not used in the reconstruction, as shown by blocks 60 and 70 of FIG. 4, as well as by blocks 34 and 36 of FIG. 2.

Figure 6A:
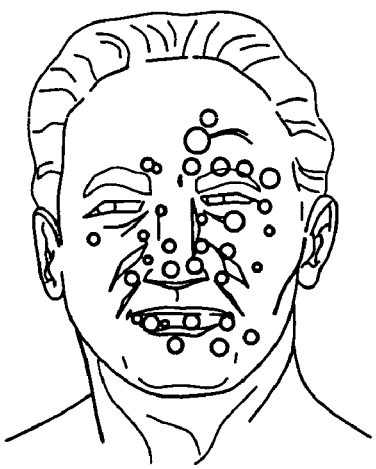
FIG. 6A is a plot of the variance of the inverse depth for different features in a face sequence.
Figure 6B:
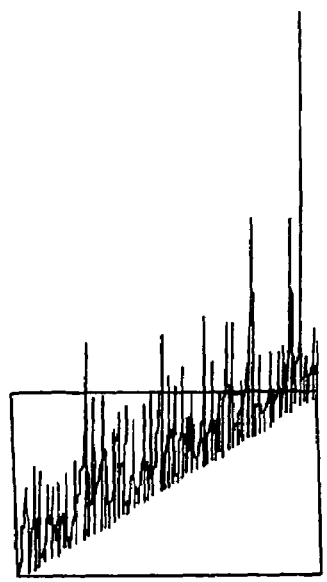
FIG. 6B is a plot showing the structure of the covariance matrix.

The technique is similar to the gradient base method, except that, for more accurate results, it was repeated for each of these initial frames and a final estimate was obtained using boot strapping techniques. Assuming that the statistics computed in block 70 of FIG. 4 and unit 34 of FIG. 2, remains stationary over the frame used in the reconstruction, the errors estimated from the first few frames were not used for obtaining $R_u$ (in Eq. 11). The variance in the inverse depth computed using the theoretical analysis presented supra is shown in FIGS. 6A and 6B.

Figure 7:
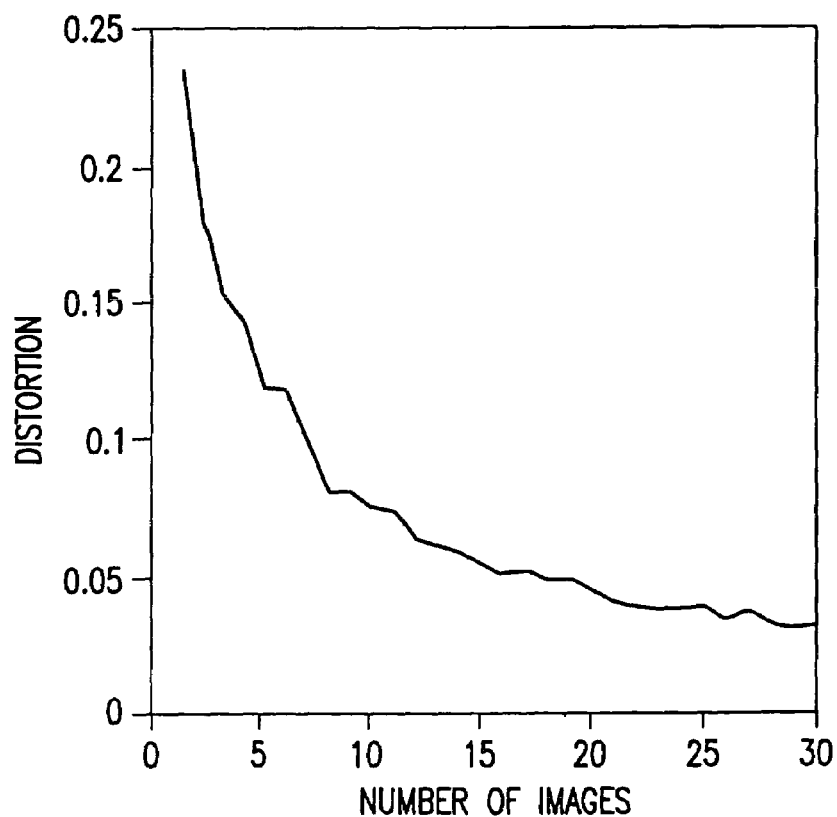
FIG. 7 represents the change in the distortion of the 3D estimate from the SFM algorithm with the number of images processed.
Figure 8A:
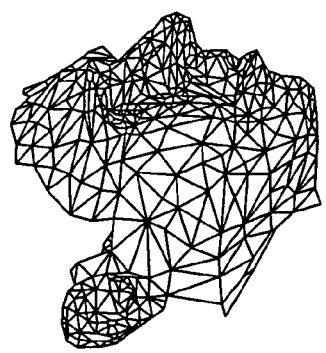
Figure 8B:
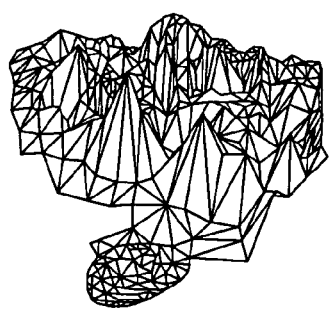
Figure 8C:
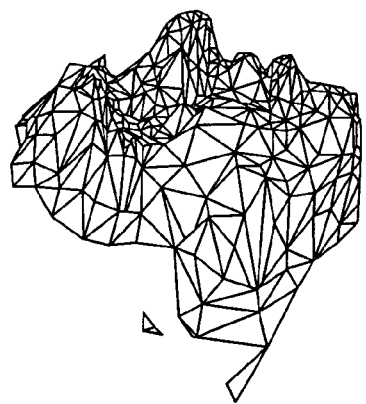
Figure 8D:
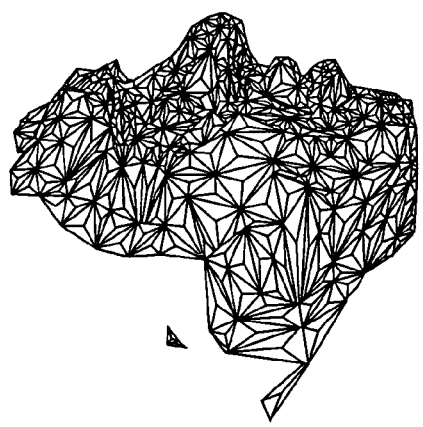

The diameters of the circles on the face (FIG. 6A) indicate the variance in the motion estimate for the points which were tracked across the video sequence. A plot of the covariance matrix is shown in FIG. 6B, which permits computation of the relative magnitudes of the errors. It was assumed that the feature points are statistically independent. The quality evaluation of the fusion algorithm was calculated using the rate-distortion function of (Eq. 15). FIG. 7 plots the VRD curve for 30 frames of the video sequence. The output, without texture mapping, of the multi-frame SfM algorithm is shown in FIG. 8(*b*) where the model is represented using a triangular mesh. The model shown is obtained after the registration process which was disclosed supra. It is evident from these plots that the general characteristics of the face are represented, however, it is also clear that a pure SfM algorithm is not enough for a completely satisfactory reconstruction of the face. At this point, the generic model is introduced into the reconstruction strategy, as shown in blocks 120–130 of FIG. 4, as well as into the block 24 of FIG. 1.

Figure 9:
FIG. 9 shows the vertices indicated with axis which form part of the line processes indicating a change in depth values.

FIG. 8(*a*) represents the generic mesh. The line process was calculated on the basis of this generic mesh. In FIG. 9, the vertices of the generic mesh that indicate the boundaries between regions with sharp changes in depth are marked with black 'x's. For these vertices, $l_i=1$ (in Eq. 23). The local derivatives were calculated at each of the vertices of the generic mesh. The vertices at which there was a sharp change in the magnitude of the depth, were selected to indicate that they belong to a line process. Thus, the line processes form the boundaries between regions having different depth values and divide the set of vertices into different equivalence classes.

For each vertex, a neighborhood set of vertices for the optimization function in (Eq. 23) is identified. The vertices which are within a certain radial distance are identified as belonging to the neighborhood set of the central vertex. However, if a line process is encountered within this region, only those vertices which are in the same equivalence class as the central one are retained in the neighborhood. Since the entire process of determining the line processes and neighborhood sets is done on the generic mesh, it does not need to be done separately for each 3D model.

The combinatorial optimization function in (Eq. 23) was implemented using the simulated annealing procedure based on a Metropolis-Hastings sampler. At each temperature 100 iterations were carried out and this was repeated for a decreasing sequence of 20 temperatures. Although this is much below the optical annealing schedule suggested by Geman and Geman whereby the temperature $T_k$ should decrease sufficiently slowly as $$\varphi\left(\log\sum_{i=1}^{k} N_i\right)^{-1}, N_i$$

being the total number of iterations at temperature $T_i$, it does give a satisfactory result for the face modeling example. We used a value of $\mu=0.7$ in (Eq. 23). The final smoothed model is shown in FIG. 8(*c*).

Next, the texture was mapped onto the smoothed model in FIG. 8(*c*). Direct mapping of the texture from the video sequence is not possible since the large size of the triangles smears the texture over its entire surface. In order to overcome this problem, each of the triangles was split into smaller ones. This was done only at the final texture mapping stage. The initial number of triangles was enough to obtain a good estimate of the depth values, but not to obtain a good texture mapping. This splitting at the final stage helps to save computation time, since the depth at the vertices of the smaller triangles is obtained by interpolation, not by the optimization procedure. The fine mesh onto which the texture is mapped is shown in FIG. 8(*d*).

As was presented supra, the Robbins-Monro stochastic approximation (RMSA) is employed in the method of the present invention. The concept of stochastic approximation (SA) has been developed in statistics for certain sequential parameter estimation problems. It may be considered as a recursive estimation method, updated by an appropriately weighted, arbitrarily chosen error corrective term, with the only requirement that in the limit it converges to the true parameter value sought. To overcome multiplicity of the sources of error that combine in a complicated manner and the danger of assuming a statistical model that is incorrect and will produce erroneous reconstructions, the SA is employed in SfM, as there is no need to know the distribution function of the error. Besides, it provides a recursive algorithm and guarantees local optimality of the estimate, which can be non-linear. On the other hand, in non-Gaussian cases, the Kalman filter is optimal only among the class of linear filters (in the mean square sense). For the Gaussian distribution, it is an optimal filter in the mean square sense. Since LMedS is a non-linear estimator and the distribution of the depth sub-estimates is unknown, SA is used to obtain an optimal solution based on the method of calculating the quantile of any distribution recursively, proposed originally by Robbins and Monro.

Let $\{e(k)\}$ be a sequence of random variables with the same distribution indexed by a discrete time variable k. A function $Q(x, e(k))$ is given such that $$E[Q(x, e(k))]=g(x)=0 \tag{26}$$

where E denotes expectation over e. The distribution of $e(k)$ is not known; the exact form of the function $Q(x, e)$ may also be unknown, though its values are observed and it can be constructed for any chosen x. The problem is to determine the solution of $g(x)=0$. Robbins and Monro (RM) suggested the following scheme for solving (Eq. 26) recursively as time evolves:

$$\hat{x}(k)=\hat{x}(k-1)+a_k Q(\hat{x}(k-1), e(k)) \tag{27}$$

where the gain sequence $\{a_k\}$ must satisfy the following conditions:

$$a_k \geq 0, \quad a_k \to 0, \quad \sum_{k=1}^{\infty} a_k = \infty, \quad \sum_{k=1}^{\infty} a_k^2 < \infty. \tag{28}$$

A popular choice of the gain sequence, which was used in our experiments also, is $a_k=a/(k+1)^{0.501}$.

Stochastic gradient is only one of the ways of applying stochastic approximation ideas. It can be viewed as the stochastic analog of the method of steepest descent. However, as is well known in the optimization literature, steepest descent is fairly inefficient, especially when the iterates get close to the minimum. Since Newton's method gives an improvement over the steepest descent method for deterministic problems, it is reasonable to assume that it will perform better in the stochastic approximation case also. Suppose that for each x, we can construct an approximation of the Hessian, denoted by $\bar{L}''(x, e^k)$, where $e^k=[e(k), e(k-1), \ldots, e(1)]$. Then the natural stochastic equivalent of Newton's method is $$\hat{x}(k)=\hat{x}(k-1)-a_k[\bar{L}''(x, e^k)]^{-1} Q(\hat{x}(k-1), e_k). \tag{29}$$

We shall call this the "stochastic Newton's method".

It has been shown that the estimate obtained from SA is unbiased, consistent and asymptotically normal, and in many cases, also efficient.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A method of 3-dimensional (3D) object reconstruction from a video sequence of two-dimensional (2D) images using a generic object model, including the steps of:
    establishing a processing system;
    producing a video sequence of 2D images of said object;
    introducing in said processing system said video sequence of the 2D images of said object;
    generating a 3D estimate defining an intermediate computer generated model of said object;
    evaluating distortion level of said 3D estimate to obtain data on errors contained in said 3D estimate;
    optimizing said 3D estimate by:
    (a) introducing in said processing system a generic object model,
    (b) smoothing said 3D estimate by correcting the same for said errors contained therein by comparing said 3D estimate with said generic object model, and
    (c) generating a final 3D computer generated object model.

2. The method of claim 1, where the step of evaluating distortion levels includes the step of:
    applying statistical error characterization to said 3D estimate, said data on the errors being indicative of first regions in said 3D estimate containing local distortion.

3. The method of claim 1, where the step of smoothing said 3D estimate includes:
    applying a correcting energy minimization function thereto, said function comparing second regions of said 3D estimate containing depth discontinuities with corresponding regions of said generic object model, and correcting said second regions of said 3D estimate.

4. The method of claim 3, where the step of smoothing said 3D estimate includes the steps of:
    aligning said 3D estimate with said generic object model,
    identifying boundaries of said second regions containing depth discontinuities, and
    smoothing said second regions enveloped by said boundaries.

5. The method of claim 1, where said optimizing said 3D estimate includes the step of:
    applying Markov Chain Monte Carlo sampling techniques thereto.

6. The method of claim 1, where the step of generating said 3D estimate includes the step of:
    applying Structure from Motion (SfM) techniques directly to said video sequence.

7. The method of claim 1, wherein said 3D estimate includes a plurality of multi-frame intermediate reconstructions, each said multi-frame intermediate reconstruction corresponding to a respective pair of consequtive images of said video sequence.

8. The method of claim 1, where the step of generating said 3D estimate includes the steps:

obtaining a plurality of multi-frame intermediate reconstructions, and fusing said multi-frame intermediate reconstructions together after evaluating the error covariance of each.

9. The method of claim 8, where the step of evaluating the error covariance includes the step of:

computing an optical flow of a corresponding image of said video images sequence of the object, and analytically estimating the statistical error covariance from said optical flow.

10. The method of claim 8, where the step of fusing includes the step of:

monitoring the progress of said fusion to determine the number of said multi-frame intermediate reconstructions required to achieve a tolerable level of distortion of a fused said 3D estimate to be compared with said generic object model.

11. The method of claim 10, wherein said monitoring is based on a rate-distortion function.

12. The method of claim 8, where the step of fusion includes the step of applying stochastic recursive approximation technique to each multi-frame intermediate reconstruction.

13. The method of claim 1, further comprising the step of:

after said step (b), mapping a texture onto the smoothed 3D model of the object.

* * * * *